United States Patent
Hong et al.

(10) Patent No.: US 10,926,927 B2
(45) Date of Patent: Feb. 23, 2021

(54) CUSHION SLEEVE

(71) Applicant: Panduit Corp., Tinley Park, IL (US)

(72) Inventors: Adam W. Hong, Elgin, IL (US); Russell K. Morrow, Tinley Park, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/722,092

(22) Filed: Dec. 20, 2019

(65) Prior Publication Data

US 2020/0216241 A1   Jul. 9, 2020

Related U.S. Application Data

(60) Provisional application No. 62/789,258, filed on Jan. 7, 2019.

(51) Int. Cl.
*B65D 63/10* (2006.01)

(52) U.S. Cl.
CPC ....... *B65D 63/1018* (2013.01); *B65D 63/109* (2013.01); *B65D 2563/103* (2013.01)

(58) Field of Classification Search
CPC ................ B65D 63/1018; B65D 63/109
See application file for complete search history.

(56) References Cited

U.S. PATENT DOCUMENTS

| | | | |
|---|---|---|---|
| 2,387,295 A | 10/1945 | Robertson | |
| 2,936,982 A | 5/1960 | Cushenbeny | |
| 3,593,383 A * | 7/1971 | Ellis | B65D 63/1027 24/46 |
| 4,318,518 A | 3/1982 | Davis | |
| D273,841 S * | 5/1984 | Chace | D22/199 |
| 5,396,684 A * | 3/1995 | Yocom | F16L 3/233 24/16 PB |
| 5,507,043 A | 4/1996 | Howe | |
| 5,581,850 A * | 12/1996 | Acker | F16L 3/23 24/16 PB |
| 5,799,376 A * | 9/1998 | Harsley | B65D 63/10 24/16 PB |
| 6,638,617 B2 | 10/2003 | Kim et al. | |
| 6,640,393 B2 * | 11/2003 | Wendle | B65D 63/1027 24/16 PB |

(Continued)

FOREIGN PATENT DOCUMENTS

| | | |
|---|---|---|
| EP | 2194282 A1 | 6/2010 |
| GB | 2528928 A | 2/2016 |
| KR | 20170038560 A | 4/2017 |

*Primary Examiner* — Robert Sandy
*Assistant Examiner* — David M Upchurch
(74) *Attorney, Agent, or Firm* — Christopher S. Clancy; James H. Williams; Aimee E. McVady

(57) ABSTRACT

A cushion sleeve that protects a bundle of cables secured to a support structure by stainless steel strapping. The cushion sleeve includes a top, a bottom, a first end, and a second end. The cushion sleeve includes a body and sidewalls extending from the body. The cushion sleeve also includes a barbed tongue extending from the first end or the second end of the cushion sleeve and slots located at the opposite end of the cushion sleeve. When installing the cushion sleeve, the barbed tongue is inserted through one of the slots and pulled until the cushion sleeve is tight around the cable bundle.

16 Claims, 9 Drawing Sheets

(56) References Cited

U.S. PATENT DOCUMENTS

| | | | |
|---|---|---|---|
| 7,404,238 B2 * | 7/2008 | McNeill | B65D 63/1027 24/16 PB |
| 9,009,923 B2 | 4/2015 | Rouleau et al. | |
| 9,106,069 B2 | 8/2015 | Frizzell | |
| 9,309,719 B2 | 4/2016 | Sylvester et al. | |
| 9,353,892 B2 | 5/2016 | Frizzell et al. | |
| 9,488,201 B2 | 11/2016 | Sumners | |
| 9,488,298 B2 | 11/2016 | Calvert | |
| 9,551,438 B2 | 1/2017 | Frizzell | |
| 9,719,300 B2 | 8/2017 | Sylvester et al. | |
| 2005/0278901 A1 | 12/2005 | Huang | |
| 2012/0180268 A1 * | 7/2012 | Chen | B65D 63/1018 24/16 R |
| 2014/0283340 A1 * | 9/2014 | Beckman | B65D 63/109 24/16 PB |
| 2015/0275578 A1 | 10/2015 | Sylvester et al. | |
| 2017/0328132 A1 | 11/2017 | Sylvester et al. | |

\* cited by examiner

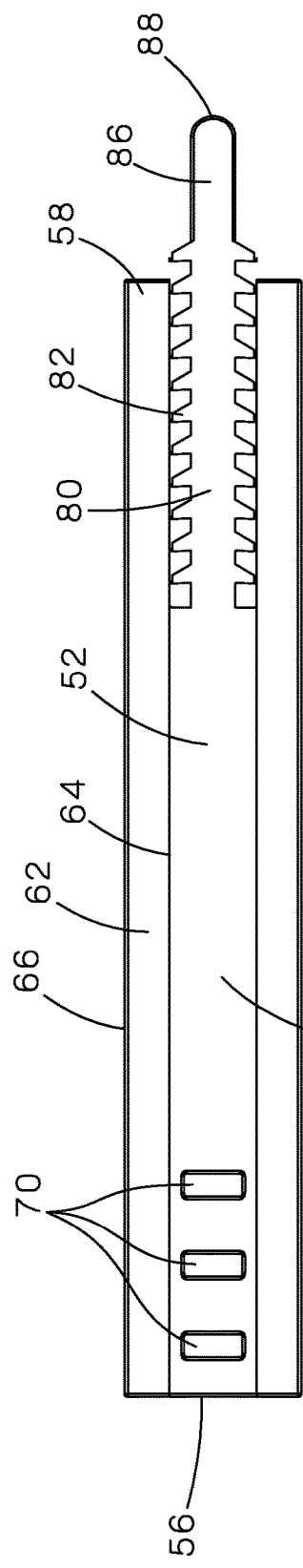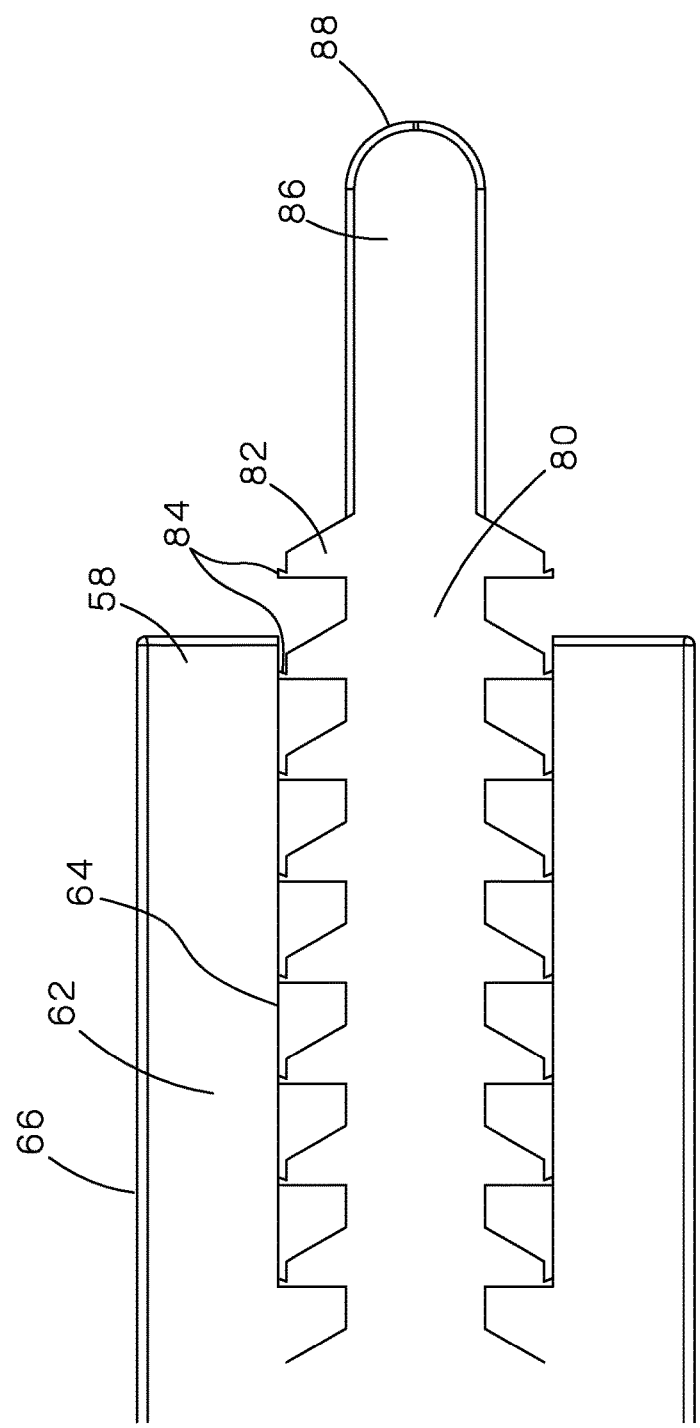
FIG.3A
FIG.3B

CUSHION SLEEVE

CROSS REFERENCE TO RELATED APPLICATIONS

This application claims priority to U.S. Provisional Application No. 62/789,258, filed Jan. 7, 2019, the subject matter of which is hereby incorporated by reference in its entirety.

FIELD OF THE INVENTION

The present invention relates to a cushion sleeve, and more particularly to a cushion sleeve used with stainless steel strapping systems.

BACKGROUND OF THE INVENTION

Cushion sleeves for stainless-steel strapping systems are known in the art. Cushion sleeves and stainless-steel strapping systems are typically installed around a bundle of cables adjacent to a support member, such as a rung of a ladder rack. Each cushion sleeve protects the bundle of cables from being damaged by the stainless-steel ties and strapping during a short circuit event. The current installation process requires the installer to manually hold the cushion sleeve in place or to slip the cushion sleeve under the stainless-steel strapping before tensioning. The cushion sleeves are often difficult to install because they are required to be held in place and they are not capable of overlapping and buckle during strap tensioning.

As a result, there is a need for an improved cushion sleeve that is easier to install and provides securement and protection of cable bundles in various configurations.

SUMMARY OF THE INVENTION

A cushion sleeve that is easy to install and provides protection for cable bundles secured to support structures. The cushion sleeve includes a top, a bottom, a first end, and a second end. The cushion sleeve also includes a body and sidewalls extending from the body. The sidewalls each have an inner edge and an outer edge. A barbed tongue extends from one end of the cushion sleeve and slots are positioned at the opposite end of the cushion sleeve. The barbed tongue includes a plurality of breakaway tabs that are attached to the inner edges of the sidewalls. During installation of the cushion sleeve, the tongue is inserted through one of the slots and pulled until the cushion sleeve is tight around the cable bundle. As the tongue is pulled, the breakaway tabs break away from the inner edges of the sidewalls to enable the cushion sleeve to be tightly wrapped around the cable bundle.

BRIEF DESCRIPTION OF THE DRAWINGS

FIG. 3A is a top view of the cushion sleeve of FIG. 1.

FIG. 3B is an exploded top view of the cushion sleeve of FIG. 3A.

DETAILED DESCRIPTION

Figure 1:
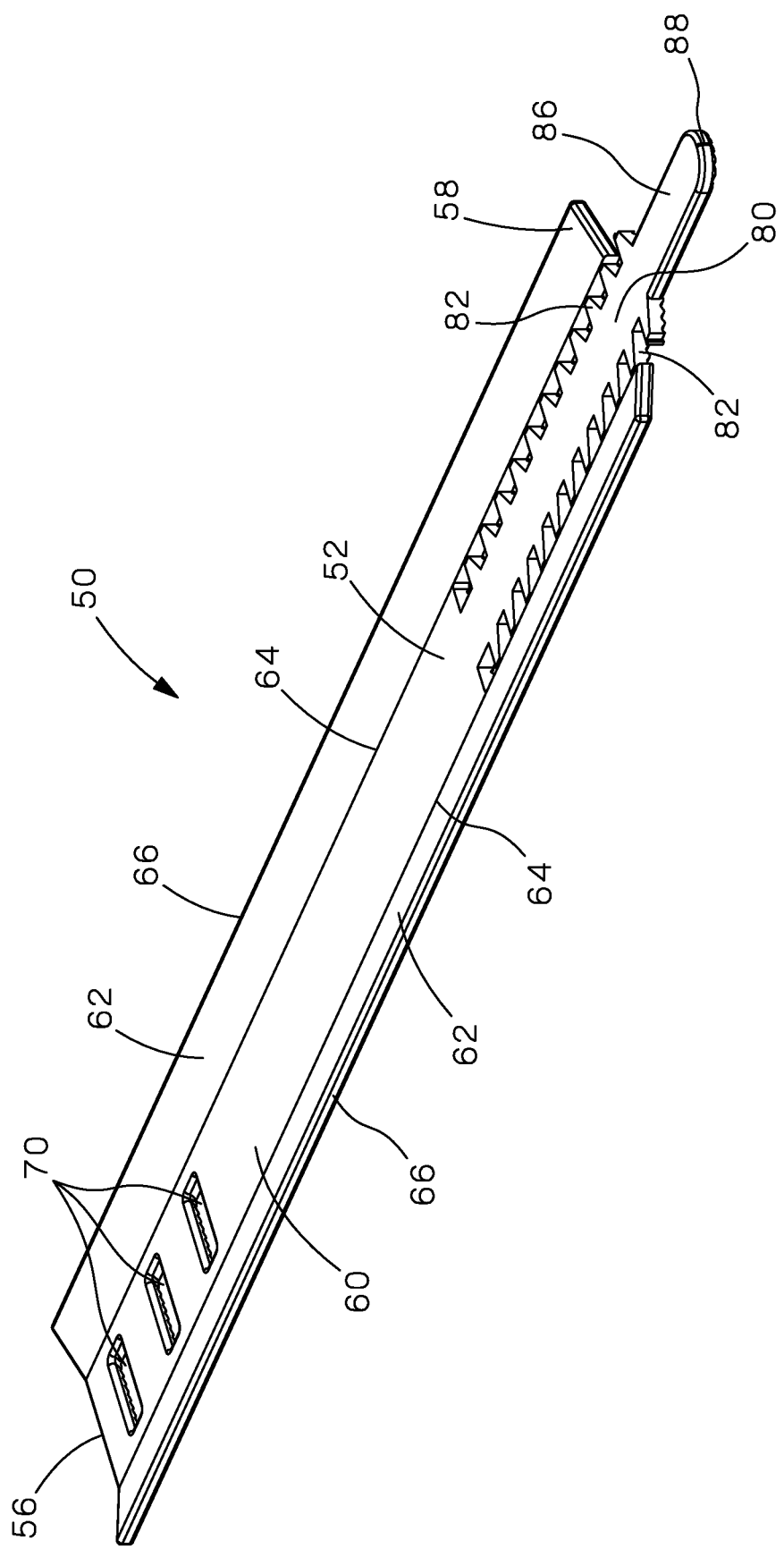
FIG. 1 is a top perspective view of the cushion sleeve of the present invention.

FIGS. 1-4 illustrate the cushion sleeve 50 of the present invention. The cushion sleeve 50 includes a top 52, a bottom 54, a first end 56, a second end 58, a body 60, and sidewalls 62 extending from the body 60. The sidewalls 62 include an inner edge 64 and an outer edge 66. The sidewalls 62 extend upwards at an angle away from the body 60.

The first end 56 of the cushion sleeve 50 includes slots 70 positioned through the body 60. The slots 70 are rectangular and extend from the top 52 to the bottom 54 of the cushion sleeve 50.

The second end 58 of the cushion sleeve 50 includes a barbed or toothed tongue 80. The barbed sections 82 are connected to the inner edge 64 of the sidewalls 62 of the cushion sleeve 50 by breakaway tabs 84 (see FIG. 3B). The breakaway tabs 84 break off as the installer pulls the tongue 80 through any of the slots 70 during installation. The breakaway tabs 84 that remain attached to the inner edge 64 of the sidewalls 62 aid to retain the sidewalls 62 together. As a result, the cushion sleeve 50 remains uniform and protects against the stainless-steel strapping.

The tongue 80 also includes an extended section 86 that does not include barbs. The extended section 86 of the tongue 80 enables the tongue 80 to be easily inserted through the slots 70 at the first end 56 of the cushion sleeve 50. The extended section 86 is easily gripped by heavy gloves typically worn by installers.

Figure 2:
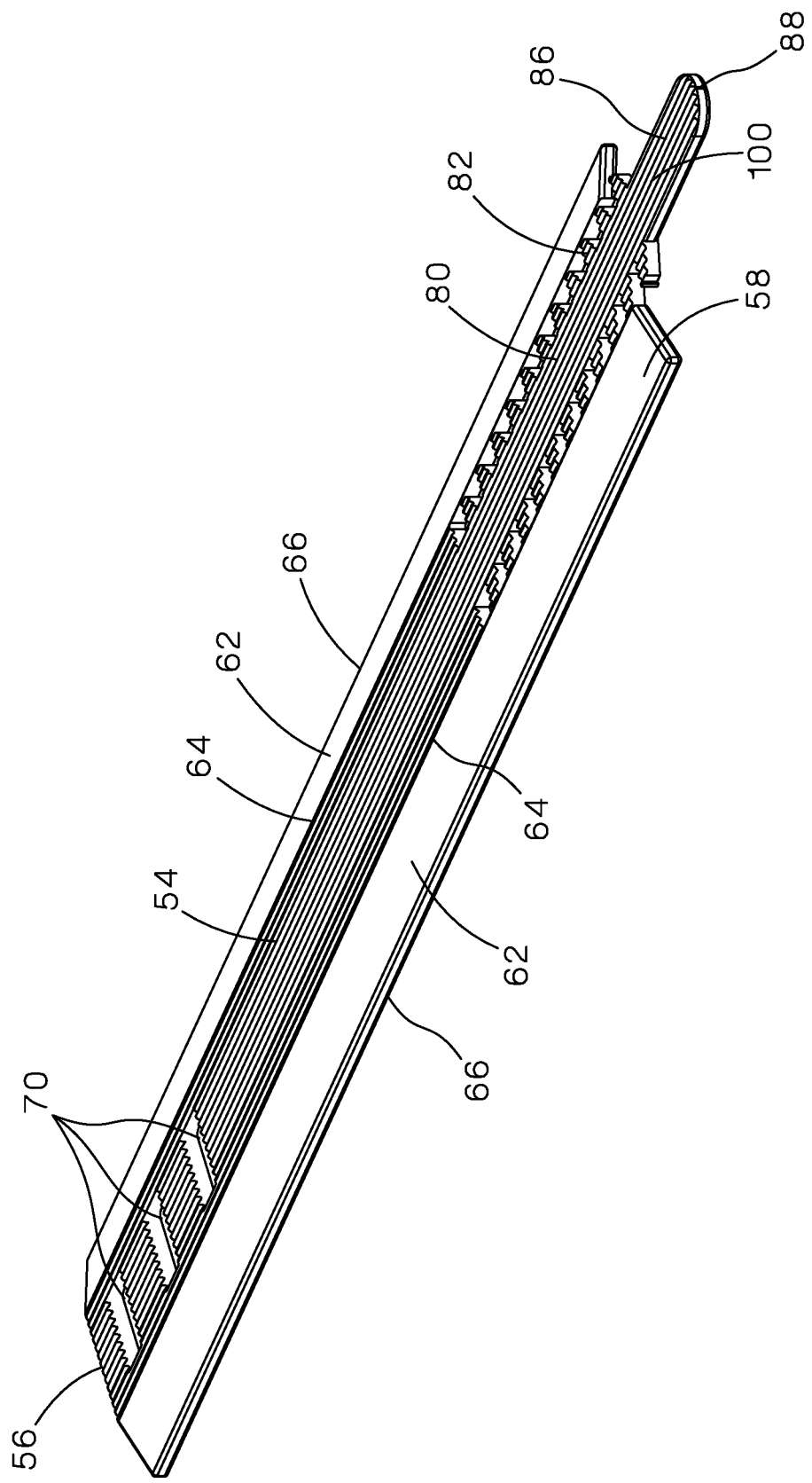
FIG. 2 is a bottom perspective view of the cushion sleeve of FIG. 1.
Figure 4:
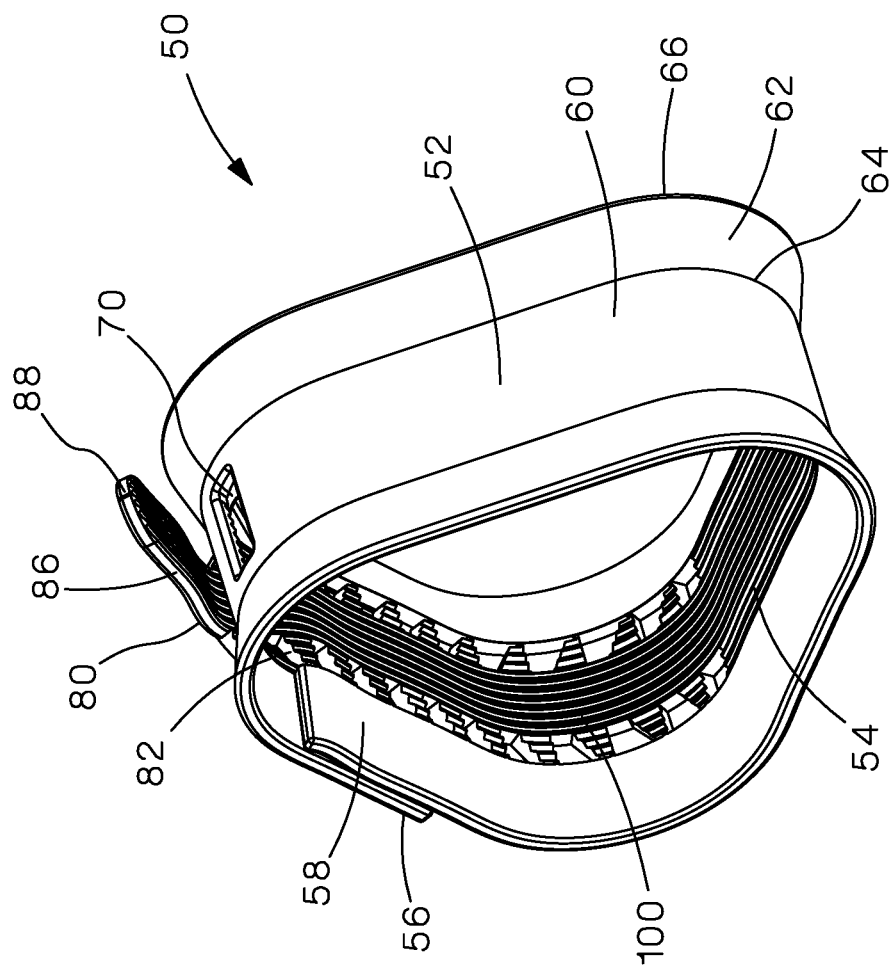
FIG. 4 is a perspective view of the cushion sleeve of FIG. 1 with the first end overlapping the second end.
Figure 5A:
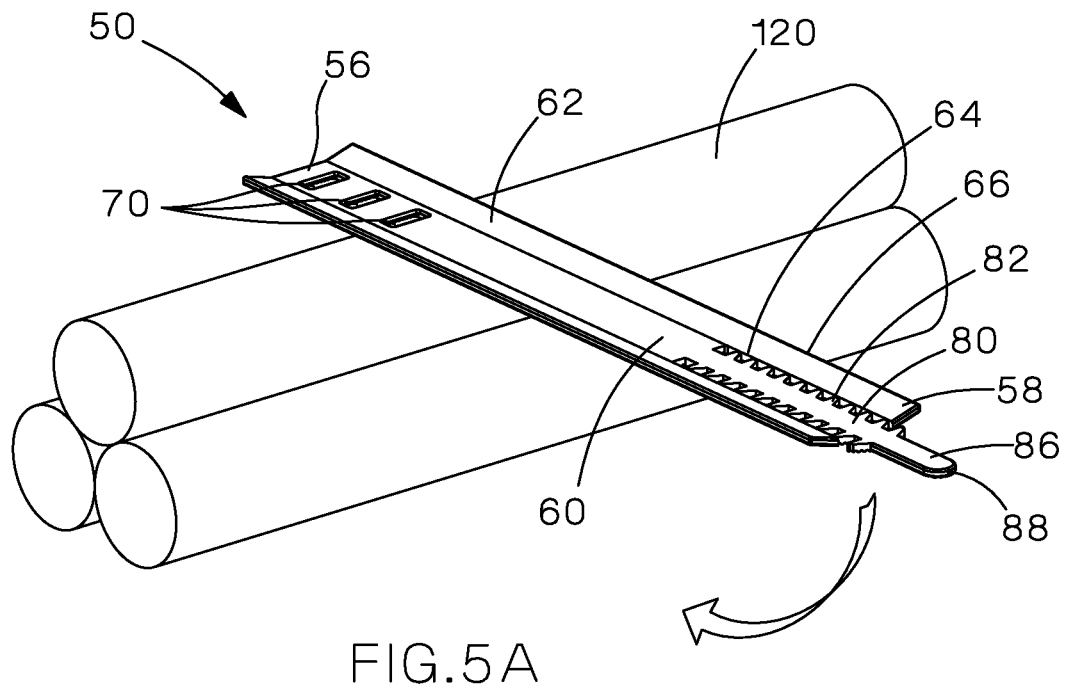
FIG. 5A is a perspective view of the cushion sleeve of FIG. 1 positioned on a cable bundle.
Figure 5B:
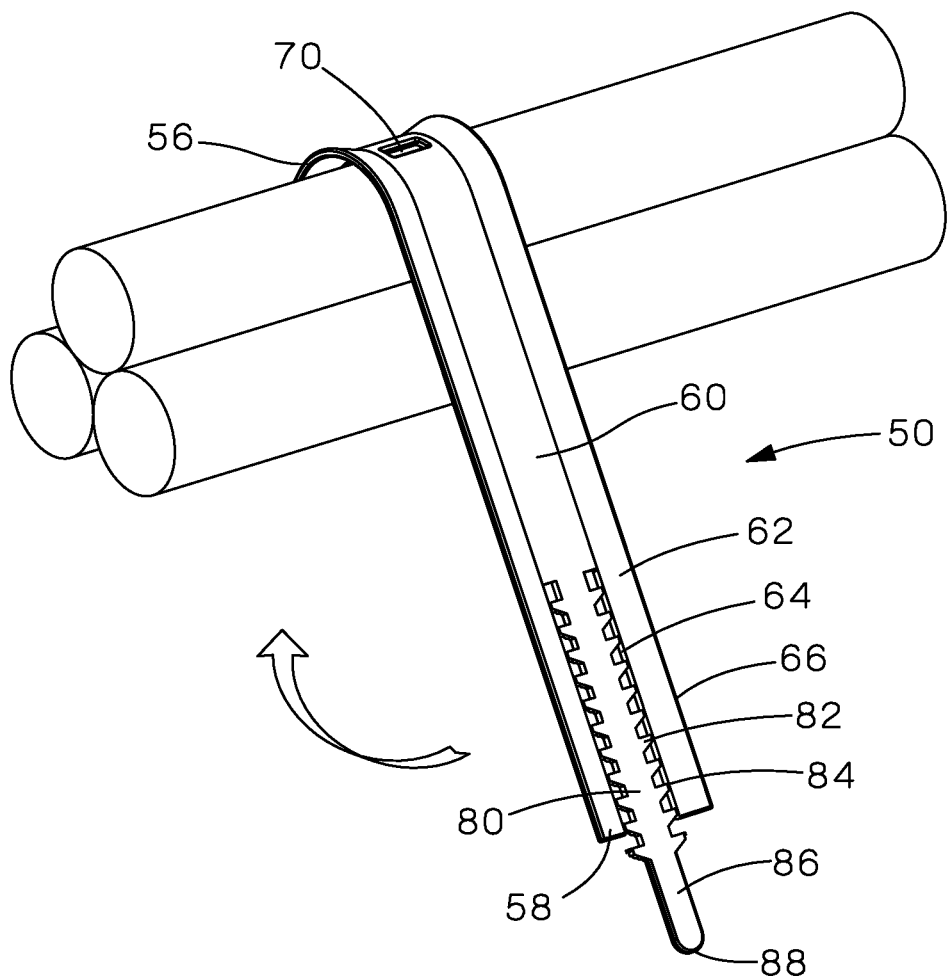
FIG. 5B is a perspective view of the cushion sleeve of FIG. 5A being wrapped around a cable bundle.
Figure 6:
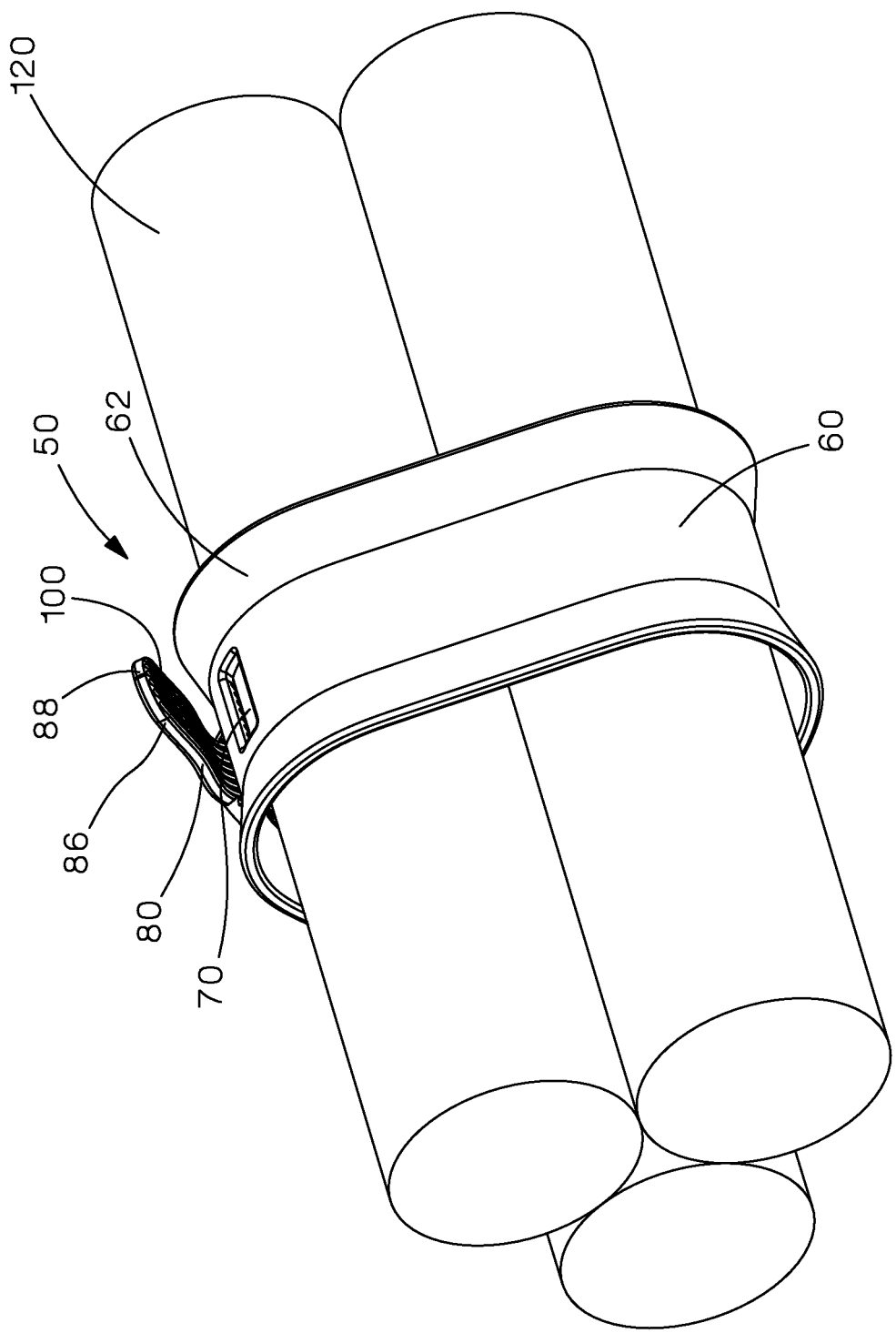
FIG. 6 is a right perspective view of the cushion sleeve of FIG. 5B wrapped around a cable bundle.
Figure 7:
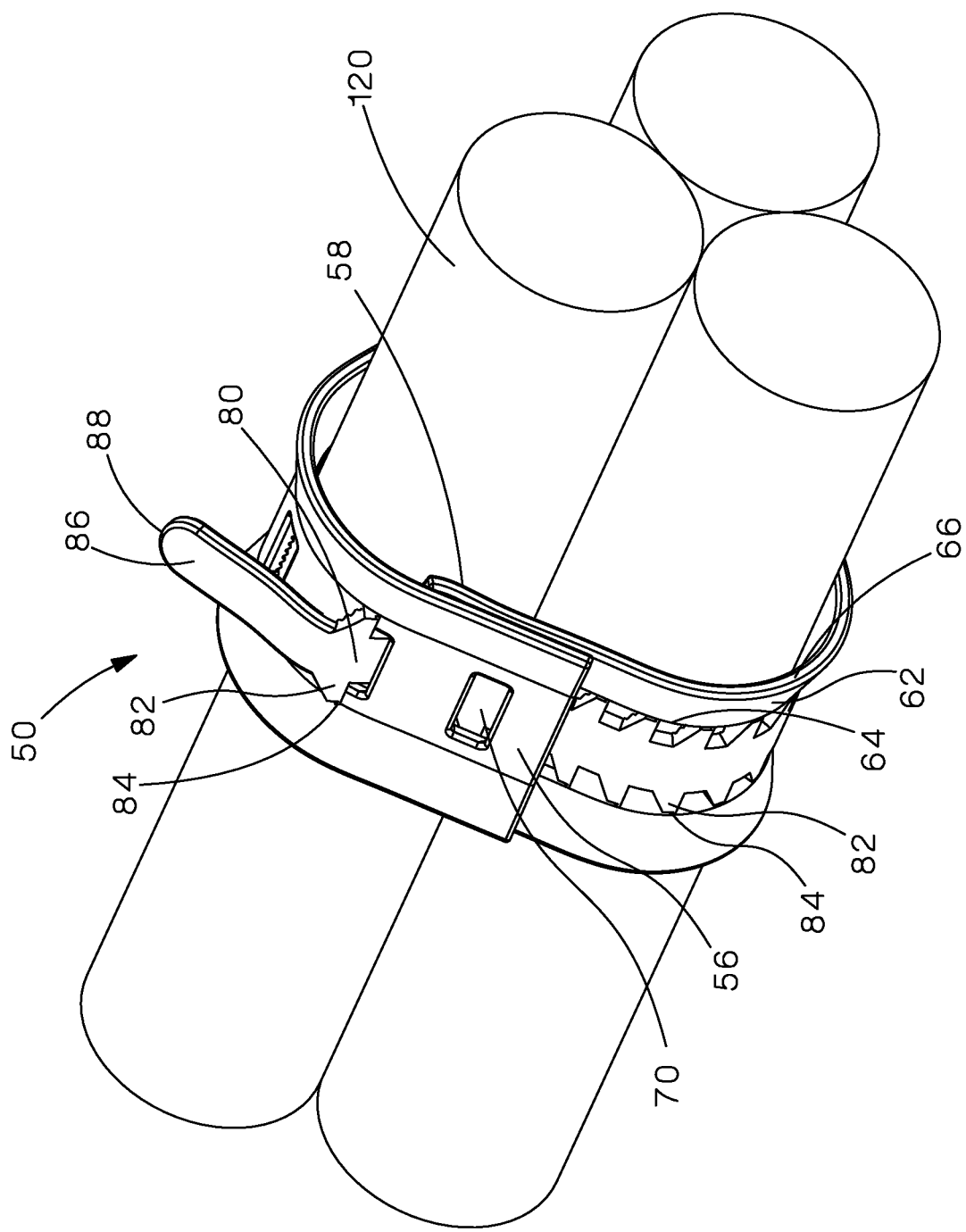
FIG. 7 is a left perspective view of the cushion sleeve of FIG. 6.

As illustrated in FIG. 2, the bottom 54 of the body 60 of the cushion sleeve 50 includes grooves 100 extending from the first end 56 to the tip 88 of the extended section 86 of the tongue 80. The grooves 100 reduce the contact area between the cushion sleeve 50 and itself during overlap (see FIG. 4). The reduced contact area creates less friction and makes the sliding of the cushion sleeve over itself easier during installation.

The cushion sleeve 50 of the present invention is designed to be used with various sizes of cables and cable bundles. The multiple slots 70 at the first end 56 enable the cushion sleeve 50 to be utilized with various bundle sizes. The length of the tongue also allows further adjustment during tensioning and permits installation on various sized cable bundles. The combination of the tongue 80 and the multiple slots 70 allow the cushion sleeve 50 to be utilized on trefoil configurations with cable diameters ranging from 20 mm to 69 mm.

The cushion sleeve 50 is manufactured by injection molding or extrusion with a post die cutting process. The cushion sleeve of the present invention is formed from a low smoke, halogen free material. The cushion sleeve is also UV and abrasion resistant.

FIGS. 5-9 illustrate the cushion sleeve 50 being installed around a cable bundle 120. To install the cushion sleeve 50 around a bundle of cables, the installer positions the first end 56 of the cushion sleeve 50 on the cable bundle 120 and wraps the second end 58 of the cushion sleeve 50 around the bundle back towards the first end 56 of the cushion sleeve 50. During the wrapping, the installer will insert the tongue 80 into one of the slots 70 at the first end 56 of the cushion sleeve 50. To secure the cushion sleeve 50 around the cable bundle 120, the installer will pull the extended tongue 80 all the way through one of the slots 70 until the cushion sleeve 50 is tight around the cable bundle 120. As the installer is pulling the tongue 80, the tabs 84 of the tongue 80 will break off from the inner edge 64 of the sidewalls 62 as each barb 82 goes through the slot 70. Once completely installed, the cushion sleeve 50 will stay freely wrapped around the cable bundle 120 and the sidewalls 62 will be tied together at the sections where the tabs 84 did not break.

Figure 8:
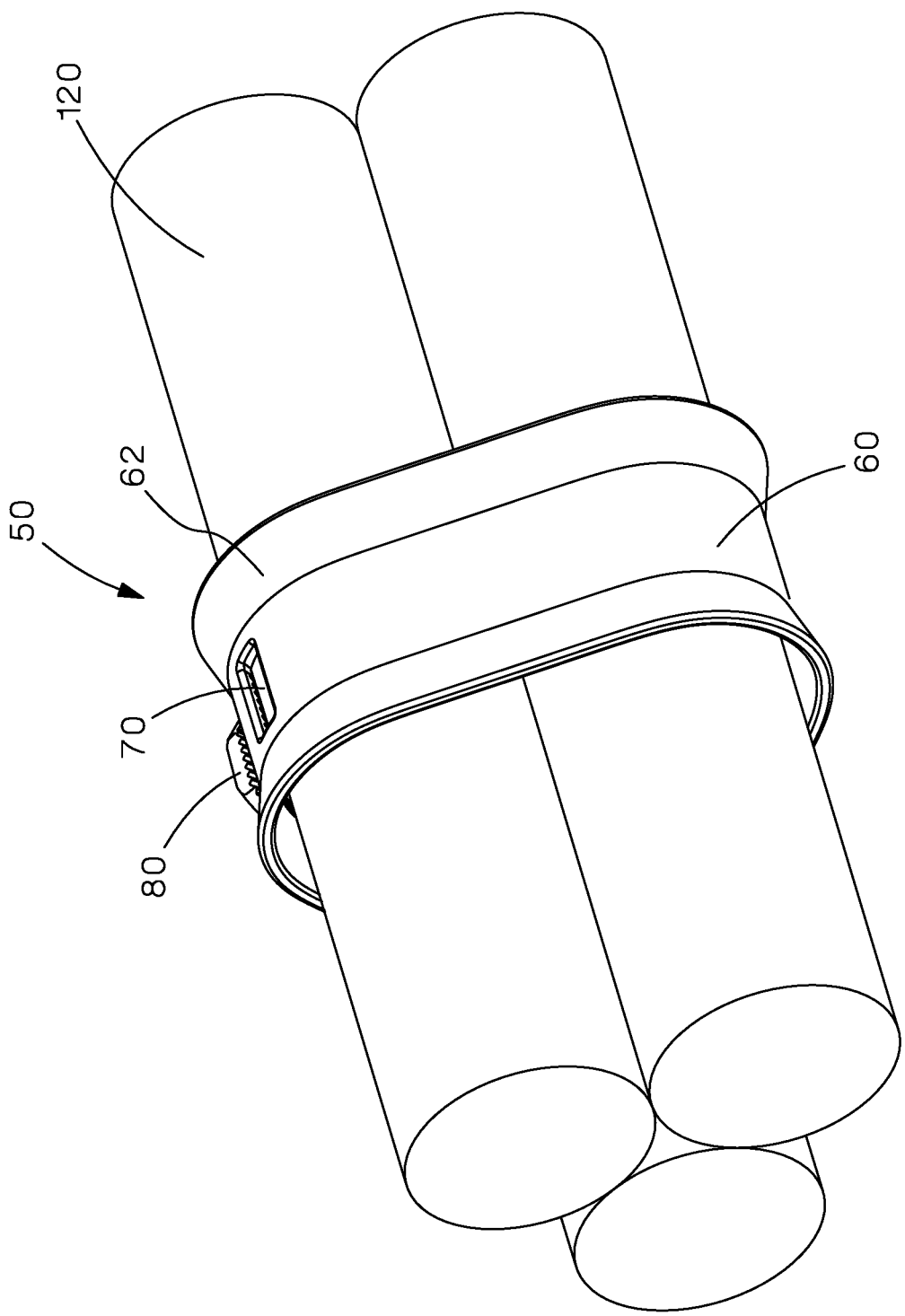
FIG. 8 is a right perspective view of the cushion sleeve of FIG. 6 with the excess tongue removed.

If desired, as illustrated in FIG. 8, the excess tongue 80 may be cut off after the cushion sleeve 50 has been installed.

Figure 9:
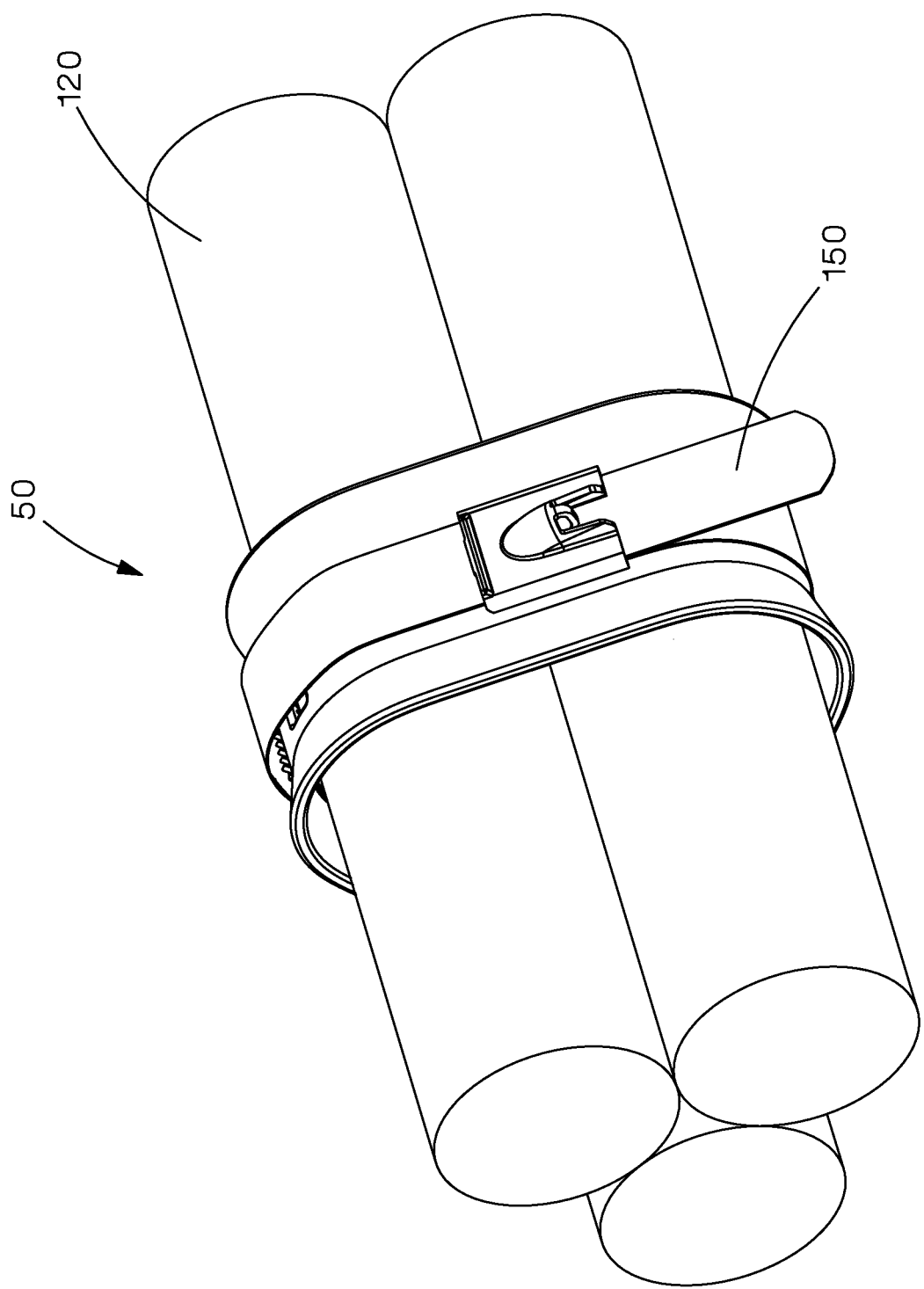
FIG. 9 is a perspective view of the cushion sleeve and cable bundle of FIG. 8 with a stainless-steel tie wrapped around the cushion sleeve.

As illustrated in FIG. 9, after the cushion sleeve 50 has been installed around a cable bundle 120, a stainless-steel strap or tie 150 may be installed around the cushion sleeve 50 and cable bundle 120 to secure the cables therein.

The cushion sleeve of the present invention provides a means for an easier installation prior to tensioning the stainless-steel straps. The current cushion sleeve provides for securement and protection of cable bundles in various sizes and configurations, such as single, double, trefoil, when installed with a stainless-steel strapping system. Each cushion sleeve can be placed and wrapped directly on the cables or around cables and brackets without the need for manually holding them before applying the stainless-steel strap. The cushion sleeve of the present invention is capable of overlapping, the fastening system stays in place over the cables, and there is less buckling for improved aesthetics of the cushion sleeve. The cushion sleeve has a reduced manufacturing cost and is quick and easy to install. The cushion sleeve of the present invention also provides full protection from the stainless-steel strapping systems and can be used with a large range of cable sizes.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cushion sleeve for protecting a bundle of cables secured to a support structure by stainless steel strapping, the cushion sleeve comprising:
   a top, a bottom, a first end, and a second end;
   a body;
   sidewalls extending from the body, the sidewalls each having an inner edge and an outer edge; and
   a barbed tongue, the barbed tongue extending from one of the first end or the second end of the cushion sleeve;
   wherein the bottom of the cushion sleeve includes grooves for reducing the contact area thereby reducing friction when the cushion sleeve is installed.

2. The cushion sleeve of claim 1, wherein the body includes slots positioned through the body extending from the top to the bottom of the cushion sleeve, the slots positioned at one of the first end or the second end.

3. The cushion sleeve of claim 1, wherein the sidewalls extend upwards at an angle away from the body.

4. The cushion sleeve of claim 1, wherein the barbed tongue is positioned between the inner edges of the sidewalls, the barbed tongue having a plurality of breakaway tabs connected to the inner edges of the sidewalls.

5. The cushion sleeve of claim 4, wherein the breakaway tabs attached to the inner edges of the sidewalls aid to retain the sidewalls together.

6. The cushion sleeve of claim 4, wherein the breakaway tabs break away from the inner edges of the sidewalls when the tongue is pulled through slots positioned through the body during installation of the cushion sleeve.

7. The cushion sleeve of claim 1, wherein the barbed tongue having an extended section for enabling the tongue to be easily gripped by installers.

8. The cushion sleeve of claim 1, wherein the cushion sleeve overlaps when installed around the bundle of cables.

9. The method of protecting a cable bundle secured to a support structure by stainless steel strapping, the method comprising:
   providing a cushion sleeve having a top, a bottom, a first end, a second end, a body with a barbed tongue, and sidewalls extending from the body;
   positioning the first end of the cushion sleeve on a cable bundle;
   wrapping the second end of the cushion sleeve around the cable bundle back towards the first end of the cushion sleeve;
   inserting the barbed tongue into at least one slot at the first end of the cushion sleeve; and
   pulling the tongue through the at least one slot until the cushion sleeve is tight around the cable bundle; and
   wherein the bottom of the cushion sleeve includes grooves for reducing the contact area of the cushion sleeve thereby reducing friction when the cushion sleeve is installed.

10. The method of protecting a cable bundle secured to a support structure by stainless steel strapping, the method comprising:
    providing a cushion sleeve having a top, a bottom, a first end, a second end, a body with a barbed tongue, and sidewalls extending from the body;
    positioning the first end of the cushion sleeve on a cable bundle;
    wrapping the second end of the cushion sleeve around the cable bundle back towards the first end of the cushion sleeve;
    inserting the barbed tongue into at least one slot at the first end of the cushion sleeve; and
    pulling the tongue through the at least one slot until the cushion sleeve is tight around the cable bundle;
    wherein the at least one slot is positioned through the body extending from the top to the bottom of the cushion sleeve;
    wherein the sidewalls extend upwards at an angle away from the body, the sidewalls each having an inner edge and an outer edge; and
    wherein the barbed tongue is positioned between the inner edges of the sidewalls, the barbed tongue having a plurality of breakaway tabs connected to the inner edges of the sidewalls.

11. The method of protecting the cable bundle of claim 10, wherein the step of pulling the tongue breaks off at least one of the breakaway tabs from the inner edges of the sidewalls as each barb extends through one of the slots.

12. The method of protecting the cable bundle of claim 9, further comprising the step of cutting off excess tongue after the cushion sleeve has been installed.

13. A cushion sleeve for protecting a bundle of cables secured to a support structure by stainless steel strapping, the cushion sleeve comprising:
    a top, a bottom, a first end, and a second end;

a body;

sidewalls extending from the body, the sidewalls each having an inner edge and an outer edge; and a barbed tongue, the barbed tongue extending from one of the first end or the second end of the cushion sleeve, wherein the barbed tongue is positioned between the inner edges of the sidewalls, the barbed tongue having a plurality of breakaway tabs connected to the inner edges of the sidewalls.

14. The cushion sleeve of claim 13, wherein the breakaway tabs attached to the inner edges of the sidewalls aid to retain the sidewalls together.

15. The cushion sleeve of claim 13, wherein the breakaway tabs break away from the inner edges of the sidewalls when the tongue is pulled through slots positioned through the body during installation of the cushion sleeve.

16. The method protecting the cable bundle of claim 10, wherein the breakaway tabs attached to the inner edges of the sidewalls aid to retain the sidewalls together.

\* \* \* \* \*